Figure 1:
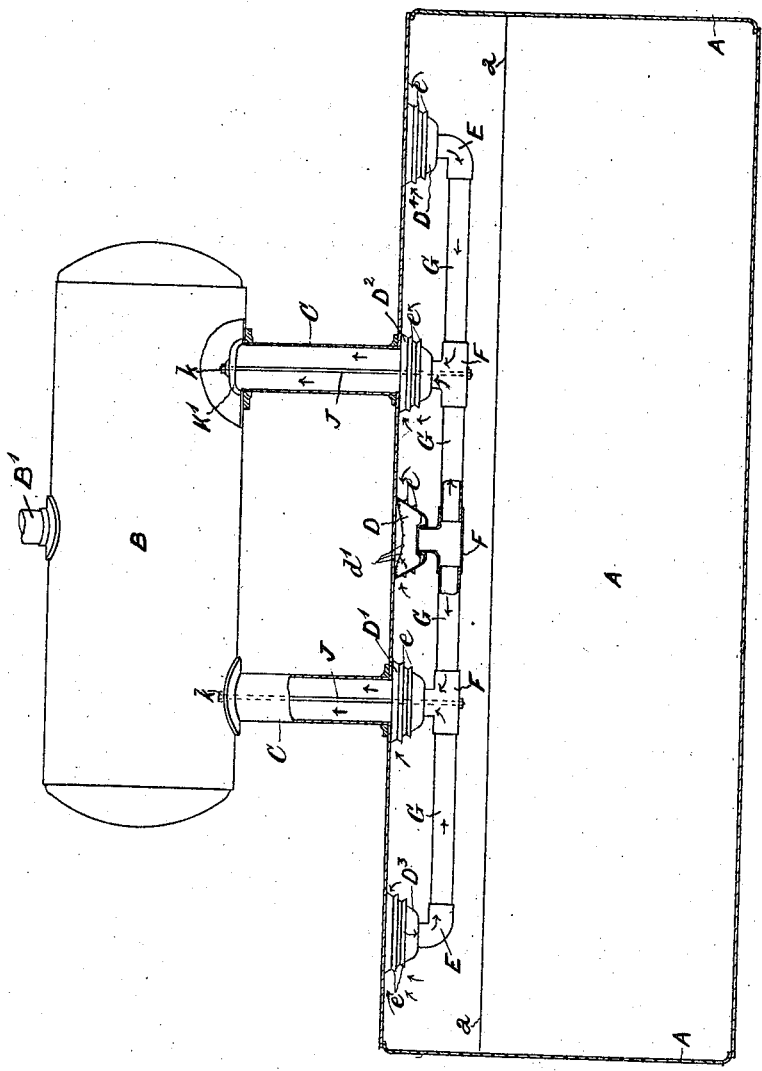

No. 847,478. PATENTED MAR. 19, 1907.
A. J. IRVINE, D. MILLS & W. H. WOOD.
STEAM AND WATER SEPARATOR.
APPLICATION FILED OCT. 30, 1905.

4 SHEETS—SHEET 1.

Witnesses:

Inventors:
Archibald John Irvine
David Mills
William Howorth Wood
by Chas. Ovendale
Attorney No. 847,478. PATENTED MAR. 19, 1907.
A. J. IRVINE, D. MILLS & W. H. WOOD.
STEAM AND WATER SEPARATOR.
APPLICATION FILED OCT. 30, 1905.

4 SHEETS—SHEET 2.

Witnesses:
R. Ovendale
F. Ovendale

Inventors:
Archibald John Irvine
David Mills
William Howorth Wood
by Chas. Ovendale
Attorney No. 847,478. PATENTED MAR. 19, 1907.
A. J. IRVINE, D. MILLS & W. H. WOOD.
STEAM AND WATER SEPARATOR.
APPLICATION FILED OCT. 30, 1905.
4 SHEETS—SHEET 3.
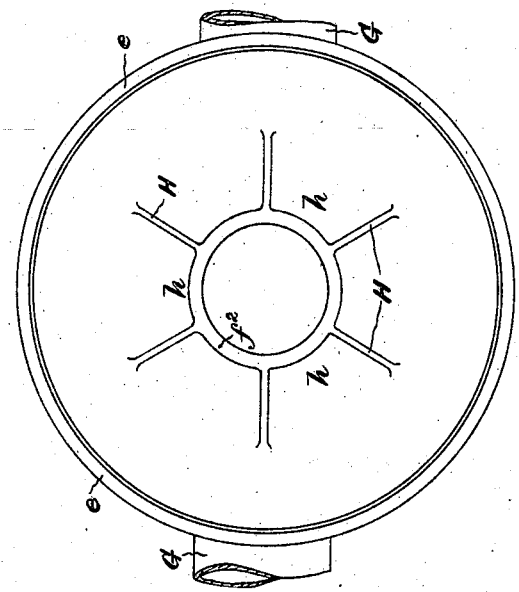
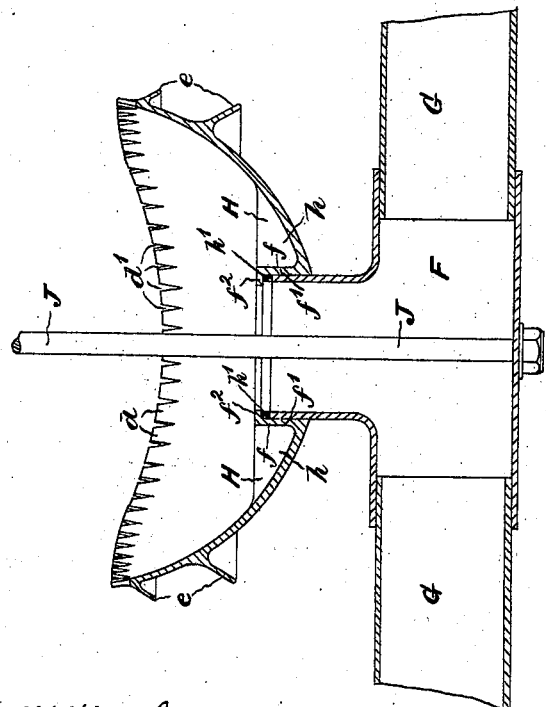
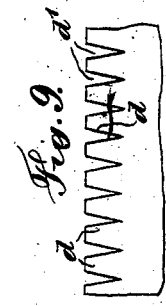
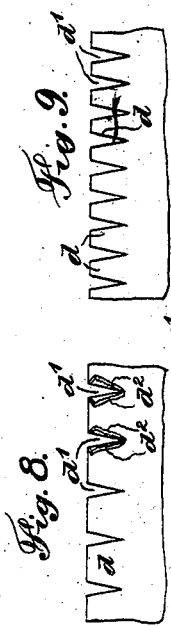
Witnesses:
R. Ovendale
F. Ovendale
Inventors:
Archibald John Irvine
David Mills
William Howorth Wood
by Chas. Ovendale
attorney No. 847,478.
PATENTED MAR. 19, 1907.
A. J. IRVINE, D. MILLS & W. H. WOOD.
STEAM AND WATER SEPARATOR.
APPLICATION FILED OCT. 30, 1905.
4 SHEETS—SHEET 4.
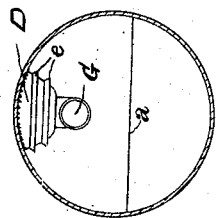
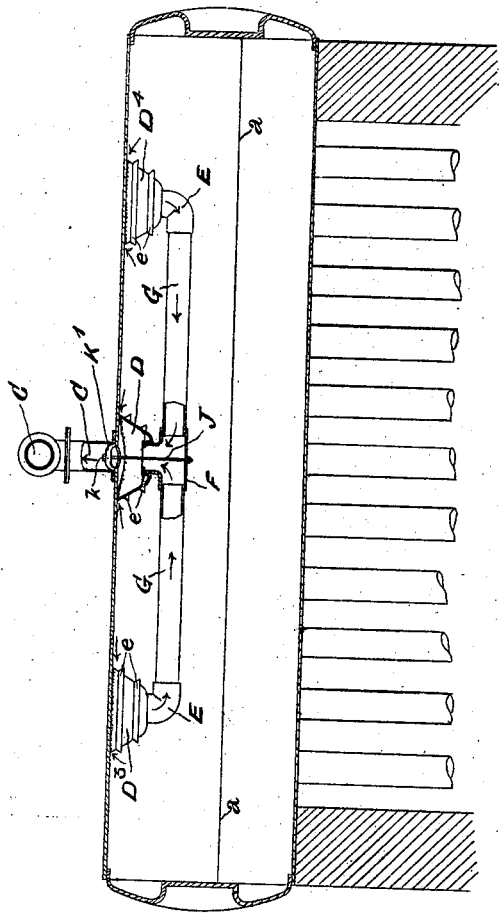
Witnesses:
Inventors:
Archibald John Irvine
David Mills
William Howorth Wood
by Chas. Ovendale
Attorney

UNITED STATES PATENT OFFICE.

ARCHIBALD JOHN IRVINE, DAVID MILLS, AND WILLIAM HOWORTH WOOD, OF JOHANNESBURG, TRANSVAAL.

STEAM AND WATER SEPARATOR.

No. 847,478. Specification of Letters Patent. Patented March 19, 1907.

Application filed October 30, 1905. Serial No. 285,164.

*To all whom it may concern:*

Be it known that we, ARCHIBALD JOHN IRVINE, DAVID MILLS, and WILLIAM HOWORTH WOOD, subjects of the King of Great Britain, residing at Johannesburg, Transvaal, have invented certain new and useful Improvements in Steam and Water Separators, of which the following is a specification.

This invention relates to means or apparatus for separating water from steam in steam-boilers. It is designed with the object of dispensing with apparatus or appliances external to or independent of the boiler proper for accomplishing this purpose; and our invention provides a simple and efficient contrivance therefor.

The invention may be readily adapted to existing boilers without necessitating extensive alterations.

Our invention consists, essentially, in the employment of one or more saucer-shaped vessels, the number and arrangement of which may be suitably varied, according to the size of the boiler, said saucers or vessels being arranged inside the water-drum at the top and above the highest water-level, which vessels round their rims or edges are formed with slots, serrations, or apertures, which to the outside of the vessel are provided with sharp or projecting edges, so that as the steam passes through the apertures or serrations the water carried in suspension therein is prevented entering the saucers or vessels along with the steam.

Our invention further consists in providing said saucers or vessels with one or more external flanges or projections, which serve to prevent the water being splashed through the apertures into the saucer-shaped vessels and also as drip-plates. These splash or drip plates also serve for directing any water that may be deposited upon the ragged edges of the serrations or apertures away from the sides of the vessel.

The invention relates, further, to the construction of the vessels with a number of fins, vanes, or webs on the inside, which serve for evaporating any water that may enter the vessels through the serrations or apertures, and so prevent it accumulating therein and passing to the steam-outlet pipe or pipes.

We will now proceed with a detailed description of our invention by aid of the accompanying drawings, wherein—

Figure 3:
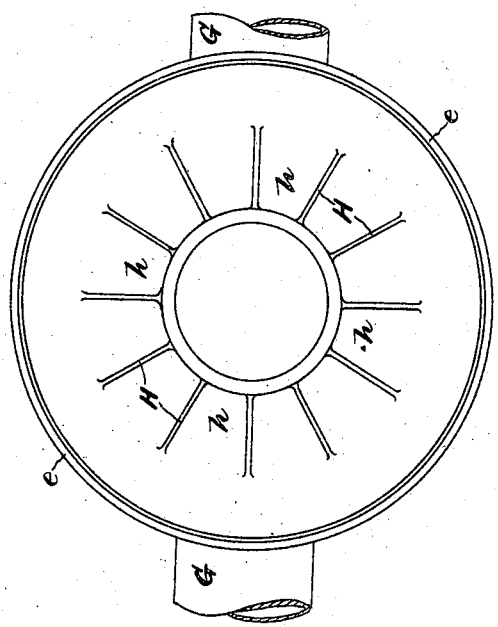
Figure 4:
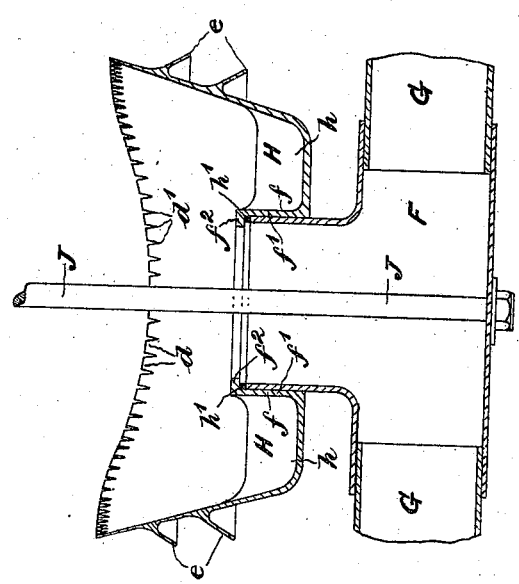
Figure 5:
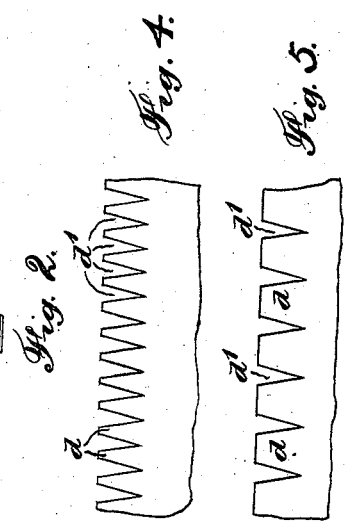

Figure 1 represents an elevation of a steam-boiler, partly in section, showing our invention applied thereto. Fig. 2 is a sectional elevation of one form of the saucer-shaped vessel and its connections. Fig. 3 is a plan of Fig. 2. Fig. 4 represents a portion of the serrated upper edge of one of the vessels. Fig. 5 represents a portion of the serrated upper edge of another of the vessels. Fig. 6 is a view similar to Fig. 2, illustrating a modified shape of the vessel. Fig. 7 is a plan of Fig. 6. Figs. 8, 9, and 10 represent portions of th serrated upper edges of the vessels. Fig. 11 is a longitudinal section of another form of boiler, illustrating another form of the invention; and Fig. 12 is a transverse section of Fig. 11.

Referring to Fig. 1 of the drawings, A represents the water-drum, and B the steam-drum, which communicate with one another by means of the pipes C, through which the steam passes from the drum A to the drum B. B' is the steam-outlet pipe communicating with the steam-drum B at the top. Inside the water-drum A and located at the top thereof or above the highest water-level (indicated at $a$) are arranged the five conical, hemispherical, or saucer shaped vessels D D' $D^2$ $D^3$ $D^4$. The vessels shown in connection with Fig. 1 are illustrated in detail in Figs. 2 and 3. These vessels are formed round their upper edges with serrations, teeth, notches, or indentations $d$, forming apertures or spaces $d'$. These spaces or apertures $d'$, which form the inlets for the steam, are preferably so made that they form round the outside of the vessel sharp or projecting edges, as indicated at $d^2$ in Fig. 8. These edges $d^2$ serve for preventing the water in suspension in the steam passing freely through the apertures or spaces $d'$, and the water coming into contact with said ragged edges $d^2$ is caught thereon and trickles down the outside of the vessel. The vessels are preferably constructed with one, two, or more annular projections $e$, which, as shown, are preferably directed in a downward direction, which annular projections $e$ serve as drip-plates and direct any water trickling or flowing down the outside of the vessels into the water in the water-drum A.

The vessels, as indicated at $f$, may be fashioned into a socket or internal hollow cylindrical piece $f'$, formed with an inward flange or projection $f^2$ at the top, which socket $f'$ serves to receive the elbow or T piece E F, as the case may be, which serves for connecting it to the pipe G, along which the steam flows from the vessel to the outlet. The vessels are also preferably constructed on the inside between said socket or hollow cylindrical piece $f'$ and the walls of the vessel with fins or vanes H, extending up from the bottom of the vessel, which serve to increase the radiating-surface and which, as seen in Fig. 6, form between them pockets or recesses $h$, in which any water that may enter the vessels with the steam is collected. The vessels being in the steam-space any water entering said vessels tends to evaporate, and thus the possibility of sufficient water collecting in the vessels for it to enter the steam-outlet pipes is obviated.

In Fig. 1 two of the vessels $D'$ $D^2$ are located immediately beneath the pipes C, along which the steam passes from the water-drum A to the steam-drum B, and these vessels $D'$ $D^2$ are fitted with T-pieces F. A central vessel D is also provided, located midway between the two vessels $D'$ $D^2$ or at the center of the water-drum A, which vessel D is also fitted with a T-piece F. The other two vessels $D^3$ $D^4$, which are located at or in proximity to the ends of the water-drum A, are in like manner fitted with elbow-pieces E, and the several vessels are placed in communication by means of the pipe or pipes G, fitting the elbow and T pieces E F. In Figs. 2 and 6, $h'$ represent packings of resilient or other suitable material.

For the purpose of securing the several vessels in position against the top of the shell or drum A we may provide bolts J, which pass through the vessels $D'$ $D^2$, through the T-pieces F to the side of the latter, and extend in an upward direction through the pipes C and project through bridge-pieces $K'$, arranged inside the steam-drum B and spanning the upper ends of the pipes C. By tightening the nuts $k$ on the bolts J above the bridge-pieces $K'$ the several vessels and the pipe or pipes G, placing the several vessels in communication, are securely held in position inside the water-drum A. The arrows in Fig. 1 indicate the direction of the flow of the steam. It enters the two end vessels $D^3$ $D^4$, as previously stated, passing through the spaces or indentations $d'$ between the teeth, notches, or serrations $d$ and flows through the elbow-pieces E and pipe or pipes G to the T-pieces F, communicating with the two vessels $D'$ $D^2$. The steam then flows from the T-pieces F through the vessels $D'$ $D^2$ and along with the steam which has entered the vessels $D'$ $D^2$ through their apertures $d'$ up the pipes C into the steam-drum B. The steam which enters the central vessel D also enters the pipe or pipes G, along which it flows to the two vessels $D'$ $D^2$ and from the latter to the steam-drum B, as previously explained.

In order to obtain the best results, we make the notches, teeth, or serrations $d$ in the vessels of varying size—that is to say, the vessels furthest from the steam-outlet are preferably provided with the largest spaces or apertures $d'$, and those located round the steam-outlet are provided with the smallest spaces or apertures $d'$, and any intermediate vessels with suitably-graded spaces or apertures. In Figs. 8, 9, and 10 we illustrate three different sizes of such serrations or indentations.

In Figs. 6 and 7 we illustrate a slight modification in the shape of the vessels. In this construction they are made more or less of hemispherical shape. In other respects they are similar to the construction described in connection with Figs. 2 to 5.

In Figs. 11 and 12 we show our invention adapted to a water-tube boiler. In this case three of the vessels are provided of substantially the construction illustrated in Figs. 2 and 3. The two end vessels $D^3$ $D^4$ are connected, by means of the elbow-pieces E and pipes G, with the T-piece F of the central vessel D, which is located beneath the steam-outlet pipe C. The bridge-piece $K'$, which serves for fixing the contrivance in position inside the boiler, is located inside the steam-outlet pipe C, and the bolt J, as previously described, passes through the central vessel D and through the T-piece F. By tightening the nut $k$ the vessels are drawn tightly against the top of the shell of the boiler. It will be obvious that one or more troughs may be provided and be formed with slots, holes, serrations or indentations of varying size, as in the arrangements previously referred to.

What we claim as our invention, and desire to protect by Letters Patent, is—

1. In apparatus of the character specified, a circular hollow vessel adapted to fit the shell of the boiler on the inside, the rim or upper edge of said vessel having formed therein, serrations or indentations which permit the steam to pass into the vessel and means for conducting the steam from said vessel.

2. In apparatus of the character specified, a hollow vessel shaped to fit the shell of the boiler on the inside above the highest water-level and having formed round the edge fitting the shell, notches, teeth or serrations forming openings through which the steam passes into the vessel, and an upwardly-extending interior flange forming a socket through which the steam passes from the vessel, as and for the purpose set forth.

3. In apparatus of the character specified, a hollow vessel shaped to fit the shell of the boiler above the highest water-level, the upper edge or rim of said vessel having formed therein teeth, notches or projections forming openings or passages through which the steam enters the vessel, said teeth notches or projections being provided with jagged edges, for the purpose set forth.

4. In apparatus of the character specified, a hollow cylindrical vessel adapted to fit in the interior of the boiler-shell and formed with serrations in its top edge through which steam enters said vessel, an upwardly-extending interior flange at the bottom of said vessel forming a socket for the outlet of steam, vertical fins extending between said flange and the walls of the vessel and annular exterior projections on said vessel intermediate the socket and the upper rim, substantially as described.

5. In apparatus of the character specified, a hollow vessel adapted to fit the interior of the boiler-shell and formed with openings round or in proximity to the top through which the steam enters said vessel, and with fins, vanes or webs at the bottom on the inside, for the purposes set forth.

6. In apparatus of the character specified, a hollow vessel adapted to fit the interior of the boiler-shell and formed with openings round the top through which the steam enters said vessel and with external projections and internal fins, vanes or webs, as and for the purposes set forth.

7. In apparatus of the character specified, a plurality of hollow vessels adapted to fit the interior of the boiler-shell and formed with openings of varying size in or near the top through which the steam enters said vessels, tubular connections between said vessels and the steam-outlet, and means for retaining said vessels and tubular connections in position inside the boiler-shell, for the purpose set forth.

8. In apparatus of the character specified, a plurality of hollow vessels adapted to fit the interior of the boiler-shell and formed round their upper edges with teeth forming passages between them through which the steam enters the vessels, said passages being made of varying size, tubular connections between said vessels and means for fixing said vessels and the tubular connections in position comprising a bridge-piece and bolt, substantially as and for the purposes set forth.

9. In apparatus of the character specified, a plurality of hollow vessels adapted to fit the interior of the boiler-shell and formed round their upper edges with teeth forming passages between them through which the steam enters the vessels, said teeth being formed with jagged projecting edges on the outside, the vessels being also formed with external annular projections and with internal fins, vanes or webs, tubular connections between said vessels which place them in communication with each other and with the steam-outlet, substantially as described.

10. In apparatus of the character specified, a plurality of hollow vessels located inside the shell of the boiler above the highest water-level, said vessels being constructed with openings provided with sharp or jagged edges round the top through which the steam enters said vessels and with annular splash or drip flanges and internal fins, vanes or webs, tubular connections which place the several vessels in communication with each other and with the steam outlet or outlets, and means comprising a bridge-piece and bolt for fixing said vessels and their connections in position inside the boiler-shell, substantially as set forth.

In witness whereof we have hereunto set our hands in the presence of two subscribing witnesses.

ARCHIBALD JOHN IRVINE.
DAVID MILLS.
WILLIAM HOWORTH WOOD.

Witnesses:
  CHAS. OVENDALE,
  R. OVENDALE.